United States Patent
Poor

(10) Patent No.: US 7,911,660 B2
(45) Date of Patent: Mar. 22, 2011

(54) METHOD AND APPARATUS FOR DATA CAPTURE FROM IMAGED DOCUMENTS

(75) Inventor: David D. S. Poor, Meadowbrook, PA (US)

(73) Assignee: CTB/McGraw-Hill LLC, Monterey, CA (US)

( * ) Notice: Subject to any disclaimer, the term of this patent is extended or adjusted under 35 U.S.C. 154(b) by 302 days.

(21) Appl. No.: 12/141,349

(22) Filed: Jun. 18, 2008

(65) Prior Publication Data

US 2008/0316552 A1 Dec. 25, 2008

Related U.S. Application Data

(62) Division of application No. 10/344,377, filed as application No. PCT/US01/16966 on May 25, 2001, now Pat. No. 7,573,616.

(60) Provisional application No. 60/224,327, filed on Aug. 11, 2000.

(51) Int. Cl.
*H04N 1/04* (2006.01)

(52) U.S. Cl. .......... 358/474; 358/501; 358/1.2; 358/518; 382/197; 382/188; 235/494; 235/475; 434/322; 434/353

(58) Field of Classification Search .................. 358/474, 358/501, 1.2, 1.14, 1.9, 518; 382/197, 188, 382/203, 287, 291, 317; 235/456, 495, 454; 434/322, 353, 362, 323
See application file for complete search history.

(56) References Cited

U.S. PATENT DOCUMENTS

| | | | |
|---|---|---|---|
| 4,219,736 A * | 8/1980 | Thibodeau | 250/557 |
| 4,300,123 A | 11/1981 | McMillin et al. | |
| 4,478,584 A | 10/1984 | Kaney | |
| 4,708,503 A | 11/1987 | Poor | |
| 4,760,464 A * | 7/1988 | Sakano | 358/461 |
| 4,857,715 A * | 8/1989 | Koch et al. | 235/456 |
| 4,937,439 A | 6/1990 | Wanninger et al. | |
| 4,978,305 A | 12/1990 | Kraft | |
| 5,001,330 A | 3/1991 | Koch | |
| 5,001,769 A * | 3/1991 | Reid-Green et al. | 382/283 |
| 5,004,896 A | 4/1991 | Serrell et al. | |
| 5,011,413 A | 4/1991 | Ferris et al. | |
| 5,017,763 A | 5/1991 | Shepard | |
| 5,085,587 A * | 2/1992 | DesForges et al. | 434/355 |
| 5,099,340 A * | 3/1992 | Kamada et al. | 358/403 |
| 5,103,490 A * | 4/1992 | McMillin | 382/284 |
| 5,134,669 A * | 7/1992 | Keogh et al. | 382/318 |

(Continued)

OTHER PUBLICATIONS

Notice of Allowance in U.S. Appl. No. 10/344,378 dated Apr. 30, 2008.

*Primary Examiner* — Negussie Worku
(74) *Attorney, Agent, or Firm* — Rothwell, Figg, Ernst & Manbeck, PC

(57) ABSTRACT

Methods and apparatus are disclosed for locating an area of interest within a digital image of a form captured by an imaging scanner. Specific examples include methods and apparatus for optical mark reading with a digital imaging scanner. In many of the methods, an image of a response form is captured by a scanner, and "target" areas for possible responses are located within the image based upon an expected location being adjusted as necessary for certain error-inducing defects in the forms or scanning process. Also disclosed are steps to normalize the darkness values of pixels captured from an optically scanned form.

18 Claims, 8 Drawing Sheets

U.S. PATENT DOCUMENTS

| | | | |
|---|---|---|---|
| 5,140,139 A | 8/1992 | Shepard | |
| 5,184,003 A | 2/1993 | McMillin et al. | |
| 5,194,966 A | 3/1993 | Quardt et al. | |
| 5,211,564 A | 5/1993 | Martinez et al. | |
| 5,291,592 A * | 3/1994 | Kita | 382/306 |
| 5,371,673 A | 12/1994 | Fan | |
| 5,420,407 A | 5/1995 | Grundy, Jr. | |
| 5,434,931 A | 7/1995 | Quardt et al. | |
| 5,452,379 A * | 9/1995 | Poor | 382/317 |
| 5,664,076 A | 9/1997 | Pluta et al. | |
| 5,672,060 A | 9/1997 | Poor | |
| 5,711,673 A * | 1/1998 | Grundy, Jr. | 434/353 |
| 5,869,789 A | 2/1999 | Reid-Green | |
| 5,873,077 A | 2/1999 | Kanoh et al. | |
| 5,991,595 A | 11/1999 | Romano et al. | |
| 6,079,624 A * | 6/2000 | Apperson et al. | 235/494 |
| 6,173,154 B1 * | 1/2001 | Kucinski et al. | 434/359 |
| 6,176,429 B1 | 1/2001 | Reddersen et al. | |
| 6,256,399 B1 | 7/2001 | Poor | |
| 6,295,439 B1 | 9/2001 | Bejar et al. | |
| 6,311,040 B1 | 10/2001 | Kucinski et al. | |
| 6,335,805 B1 | 1/2002 | Ishiguro et al. | |
| 6,352,332 B1 | 3/2002 | Walker | |
| 6,366,760 B1 | 4/2002 | Kucinski et al. | |
| 6,411,725 B1 | 6/2002 | Rhoads | |
| 6,459,509 B1 | 10/2002 | Maciey et al. | |
| 6,466,683 B1 | 10/2002 | Poor | |
| 6,526,258 B2 | 2/2003 | Bejar et al. | |
| 6,552,829 B1 | 4/2003 | Maciey et al. | |
| 6,558,166 B1 | 5/2003 | Clark et al. | |
| 6,628,834 B2 | 9/2003 | Gotsman et al. | |
| 6,684,052 B2 | 1/2004 | Kucinski et al. | |
| 6,961,482 B2 | 11/2005 | Knowles | |
| 6,963,425 B1 | 11/2005 | Nair et al. | |
| 6,988,895 B1 | 1/2006 | Lamarche et al. | |
| 7,020,435 B2 | 3/2006 | Moulthrop et al. | |
| 7,054,464 B2 | 5/2006 | Poor | |
| 7,123,764 B2 | 10/2006 | Kirk et al. | |
| 7,417,774 B2 * | 8/2008 | Poor | 358/474 |
| 7,573,616 B2 * | 8/2009 | Poor | 358/474 |
| 2002/0110798 A1 | 8/2002 | Kucinski et al. | |
| 2002/0122606 A1 | 9/2002 | Knowles | |
| 2003/0086586 A1 | 5/2003 | Poor | |
| 2004/0086841 A1 | 5/2004 | Clark et al. | |
| 2004/0185424 A1 | 9/2004 | Kucinski et al. | |
| 2004/0259067 A1 | 12/2004 | Cody et al. | |
| 2007/0008564 A1 | 1/2007 | Friedman et al. | |
| 2008/0137118 A1 * | 6/2008 | Matsutani | 358/1.9 |

* cited by examiner

FIG. 2

[IPRM=166L]
* Standard 166 spacing with
    tracks printed LEFT
Section Count=01
KeyMarkMiniWidth=16 —— 11
KeyMarkMiniHeight=6
IMR Row Spread=6
IMR Col Spread=8 —— 12

[IPRM=166L,Section=1]
Tracks=1
KeyMarkCount=1
MatrixSize=(0/47)
MatrixOrigins=(0/47;0/967)
KeyMarkPositions=(0/27)

10

13

[IPRM=634B]
* 63 lines, 48 columns even 1/6 spacing,
* centered on page in three sections :
    *      a) above top 3-fold line,
    *      b) between top and bottom tri-fold line,
    *      c) below bottom tri-fold line
* each section defined with key mark pairs
* in column 1 an column 48 of OMR columns
SectionCount=3
KeyMarkMiniWidth=16
KeyMarkMiniHeight=6 —— 11
IMR Row spread=6
IMR Col Spread=8 —— 12

[IPRM=6348,Section=1]
Tracks=0
KeyMarkCount=4
MatrixSize=(21/48)
KeyMarkMatrixOrigins=(40/40,440/980)
KeyMarkPositions=(40/40,40/980,440/40,440/980)    13a

[IPRM=6348,Section=2]
* NOTE:
* key marks are above and below the OMR response
* response positions for this section (they are in
* the OMR response area for section above & below)
Tracks=0
KeyMarkCount=4
MatrixSize=(21/48)
KeyMarkMatrixOrigins=(460/40,860/980)
KeyMarkPositions=(440/40,440/980,880/40,880/980)    13b

[IPRM=6348,Section=3]
Tracks=0
KeyMarkCount=4
MatrixSize=(21/48)
KeyMarkMatrixOrigins=(880/40,1280/980)
KeyMarkPositions=(880/40,880/980,1280/40,1280/980)    13c

10

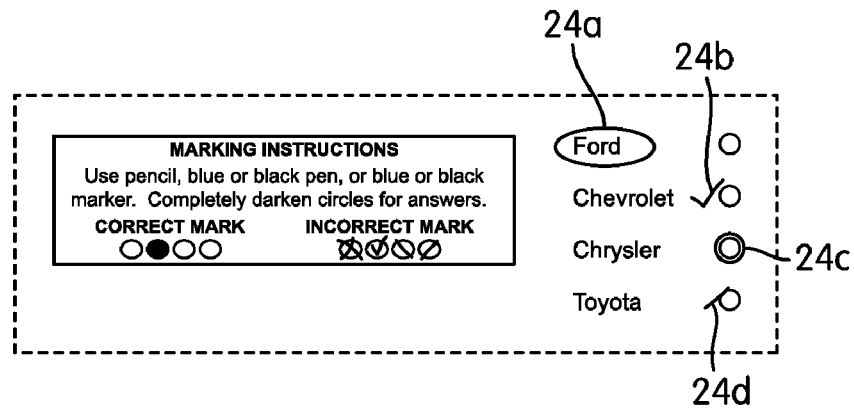
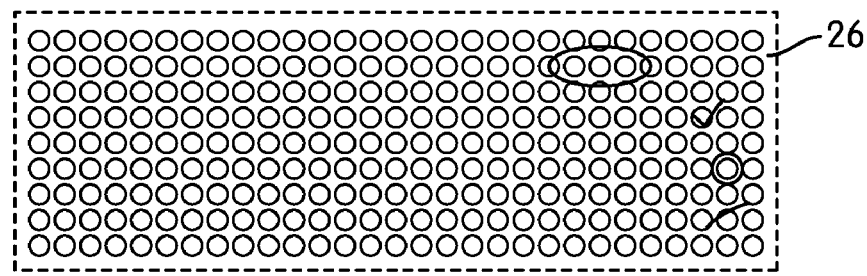
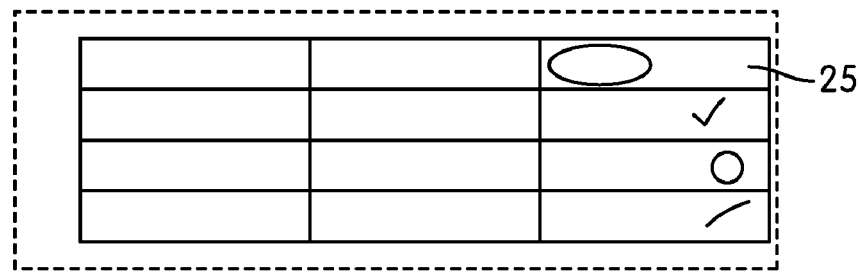
FIG. 3

FIG. 6

Proximity Weights 50

| Proximity to center | Weight |
|---|---|
| 0 | 1.00 |
| ±1 | 0.98 |
| ±2 | 0.95 |
| ±3 | 0.90 |
| ±4 | 0.80 |

51 — Pixel Weights

Pixel Relative To Center

| Row | -4 | -3 | -2 | -1 | 0 | +1 | +2 | +3 | +4 |
|---|---|---|---|---|---|---|---|---|---|
| -4 | .64 | .72 | .76 | .78 | .80 | .78 | .76 | .72 | .64 |
| -3 | .72 | .81 | .85 | .88 | .90 | .88 | .85 | .81 | .72 |
| -2 | .76 | .85 | .90 | .93 | .95 | .93 | .90 | .85 | .76 |
| -1 | .78 | .88 | .93 | .96 | .98 | .96 | .93 | .88 | .78 |
| 0 | .80 | .90 | .95 | .98 | 1.0 | .98 | .95 | .90 | .80 |
| +1 | .78 | .88 | .93 | .96 | .98 | .96 | .93 | .88 | .78 |
| +2 | .76 | .85 | .90 | .93 | .95 | .93 | .90 | .85 | .76 |
| +3 | .72 | .81 | .85 | .88 | .90 | .88 | .85 | .81 | .72 |
| +4 | .64 | .72 | .76 | .78 | .80 | .78 | .76 | .72 | .64 |

FIG. 8

METHOD AND APPARATUS FOR DATA CAPTURE FROM IMAGED DOCUMENTS

CROSS REFERENCE TO RELATED APPLICATIONS

The present application is a divisional of U.S. patent application Ser. No. 10/344,377, filed on Feb. 11, 2003 now U.S. Pat. No. 7,573,616. U.S. application Ser. No. 10/344,377 is a 35 USC §371 National Phase Entry Application from PCT/US01/16966, filed May 25, 2001, and designating the United States, and claims the benefit of U.S. Provisional Patent Application No. 60/224,327, filed on Aug. 11, 2000, the entire disclosures of which are incorporated herein by reference.

BACKGROUND OF THE INVENTION

1. Field of the Invention

This invention relates to the general field of optical scanning to collect data and digital images from documents, and within that field to enhanced methods and apparatus for locating, identifying and interpreting such data and images. Although the methods and apparatus described herein may be useful in other related tasks, the most common usage is likely to be in the processing and scoring of standardized assessment tests.

2. Description of the Prior Art

Optical and electronic technology has provided methods of effectively and efficiently collecting data in digital electronic forms. To avoid the costs in time and money of manual data entry, various methodologies have been developed to capture data directly "on-line". Nonetheless, much quantitative data are still collected by being written on paper documents. In the field of education, students are routinely asked to answer test questions on paper. Commercial institutions routinely use paper forms such as application forms, claim forms, change of address forms, assignment forms, and many others. Businesses survey customer satisfaction and employee attitudes by having them respond on paper documents. Publicly held companies send stockholders paper forms for voting. Other elections and lotteries use paper documents.

In order to avoid costly and sometimes inaccurate key-entry of data from the paper forms to electronic format, automated systems have been designed to convert the marks on the form directly into electronic data. Some applications have been highly successful, notably in the processing of lottery tickets and the processing of student test responses, especially in the area of standardized tests. For both of these applications, however, specialized machines and specialized paper must be used. Machines for reading lottery tickets are highly specialized and have little potential for applications outside their intended area. In the area of standardized tests, specialized "OMR" (Optical Mark Recognition) systems scan data from the student response forms. These "OMR scanners" are systems with hardware enabled resolution of OMR marks, and typically require that the response documents be produced with extremely tight tolerances for the paper, the inks, and precise location of the printing on the forms.

For broader applications, two optical reading approaches have been taken. The first is based on using OMR scanners and forms printed specifically for OMR systems. Customer satisfaction surveys and election ballots have been processed using such OMR technology. Because of the high precision of the forms and the machines, these applications provide accurate conversion of respondent marks into data. Although early OMR systems required that the respondent use a "#2 pencil", this was largely overcome by visual spectrum read mechanisms which can recognize blue or black pen, ballpoint, marker, and/or pencil as being intended marks. Two drawbacks remain, however; the forms are expensive to produce and they often "look like a test".

The second approach, used as an alternative to OMR systems, is based on scanning systems designed for document storage and retrieval. In such systems, a digitized image of the document is captured through the use of an "image scanner". Although some image scanners can capture shades of gray ranging from pure white to black (gray-scale scanning) and others can capture shades of color (color scanning), data collecting systems typically convert the scanned image of the document into a bi-tonal (black and white) image in which each location or "pixel" within the image is presented as on or off. Data elements are then extracted from the bi-tonal images.

Such bi-tonal imaging systems generally have some means to locate specific areas of a form, and then extract data from those areas. The extraction may include conversion of printed barcodes into text or numeric data (barcode conversion). It may include conversion of machine printed characters into text (Optical Character Recognition, or OCR). It may include writing the entire image or part of the image to one or more computer files including data files which are part of a database. It may include converting areas containing handprinted text characters into text (Handprint Recognition). It may include converting areas containing discrete response areas into data (a form of OMR).

The term "scanning" has many different technological meanings. In this context, "scanning" refers to using optical scanning methods to extract data from sheets of paper. Scanning can be accomplished with specialized hardware systems that capture data from sheets using OMR. In such hardware-based OMR systems, a specialized "read head" is used to recognize and record the presence of marks in predetermined locations as the paper progresses through the machine and passes the read head. Scanning data from sheets of paper can also be accomplished through the use of image scanners.

The following sections identifies problems that are associated with locating marks in the scanned data, discriminating between intended and unintended or spurious marks, and the requirements for precise and expensive forms.

Locating a Target Response Area:

Using OMR as an example, an "OMR response target" is a location on a form indicating where to make a response mark for OMR processing. The target is normally, but not necessarily, indicated by a preprinted circle, box or other shape on the form. A major task for any scanning system to process OMR marks is to locate each response position in the image. While the printed target show the respondent exactly where to make a mark to have it registered as an intended response, there must be a means for the scanning system to locate in the image the area corresponding to the target in order to examine that area for the presence of an intended response.

Locating the Target with Traditional OMR:

In hardware-based OMR scanners, all response positions are located in a fixed location along a vector at right angles to the movement of the paper. With standard 8½ by 11 inch documents, the paper moves along the 11 inch dimension, so that the fixed positions are across the 8½ inch dimension. One edge of the paper is designated as the "reference" edge. As the sheet of paper is transported through the machine, the reference edge abuts a guide or rail. The response positions are located in absolute dimensions from that guide or rail to define a row or line of response positions with the centers of the response positions aligned at right angles to the reference edge. Positions within the row may be referred to as the "columns" of the response positions.

Successive rows of response positions are arrayed along the reference edge. In some early machines, these rows are located by absolute dimensions from the top of the sheet of paper. More recently, however, the rows are located by a printed mark on the paper. A series of marks aligned with the reference edge of the paper locates the series of rows, resulting in a matrix of multiple rows and columns of OMR positions. Typically, the series of these marks are said to be located in the "timing track", and each mark within the series is referred to as a "timing mark". Instructions on how to prepare a form for traditional OMR are disclosed, if further reference is wanted, in Pluta, et al. (U.S. Pat. No. 5,664,076). A constraint on the creation of these forms is that the printed information on the forms must precisely match the specifications for the form.

In traditional OMR systems, a special ink is selected to print the targets. This ink absorbs little or no light in the spectrum processed by the optical system so that, if there is no other mark in an area printed in this ink, the system interprets the area as not having any mark. Some OMR systems use the infrared spectrum for processing since pencil lead absorbs much of the infrared light, while others use visual spectrum light.

For forms with timing tracks, a second, typically black, ink is used. This ink absorbs light in the appropriate spectrum and therefore can be recognized by the optical devices and processed by the system. This ink is used to print the timing tracks and other marks which may identify the type of form and/or the particular document.

A problem with traditional OMR is that the mark made by the respondent may not be recognized as an intended mark when the mark is not at the precise location being processed by the system. This mis-alignment of the mark to the process area can be caused by many factors. One possibility is that the respondent made the mark outside the target position, but mis-alignment can also be caused by discrepancies in the forms themselves, in the equipment processing the forms, or in the manner in which the forms move physically through the equipment.

The potential for mis-alignment errors is a systemic problem associated with the physical characteristics of the scanning system, as explained, for example in Koch, et al. (U.S. Pat. No. 4,857,715).

Traditional OMR scanners have a low tolerance for offset, misregistration, and poor print or paper quality in the forms. In particular, the timing tracks on scannable forms for OMR scanners must be printed to high standards of print quality and print alignment to insure that an acceptably high percentage of completed forms can later be properly scanned and scored.

The systemic problems of the OMR scanners may result in the target positions printed on the form to be shifted left or right of the locations or columns of locations being processed by the hardware. As a consequence, the OMR system does not "look" where the respondent was shown to make the marks, but looks instead to the left or the right, increasing the potential that an intended mark will be missed. This problem may be caused by the form pulling away from the guide or rail, or by the OMR device being misadjusted so that the reading mechanism shifts the location at which marks are processed closer to or further away from the guide or rail, or by printing the response positions on the form too close or too far from the reference edge. All of these cause the system to process OMR locations that are shifted left or right from the locations marked by the respondent.

A more insidious systemic problem occurs when the spacing between columns on the form is larger or less than the spacing processed by the hardware system. If this happens, some targets may be exactly aligned with the area where the hardware processes while others are shifted left or right, with the deviations increasing from one edge of the form to another. This can be caused by improperly printed documents, but more often is due to documents expanding or shrinking as a function of changing humidity and temperature. On individual forms, this can also be caused by stress, folding, or other manipulation of the form before it is scanned.

OMR positions printed on the form can also be systematically higher or lower than the locations processed by the scanning hardware. Since many OMR forms utilize track marks, this can occur when the track marks are not in exact alignment with the targets printed on the form.

Perhaps the most common and severe cause of mis-aligned response positions is when forms are "skewed" relative to the reading mechanism. This generally occurs when the reference edge of the paper is not perfectly parallel to the guide or rail. Even small deviations from parallel can move the response positions away from their correct position. The horizontal alignment of the response positions on the form correspond closely to the locations processed by the system only at the top of the form. As the reference edge of the form is further and further from the guide or rail, the horizontal alignment of the target locations and the locations processed by the machine are increasingly divergent. In a similar manner, the vertical locations of response positions adjacent to the timing tracks correspond closely to the vertical locations processed by the system, while response positions at the opposite edge of the form are increasingly displaced. The effects of the horizontal and vertical misalignment are cumulative, so that the misalignment is greatest for response positions at the edge of the form farthest from the timing tracks and at the end of the form farthest from the guide or rail.

Because of the extent to which skewed forms jeopardize the accuracy of the OMR process, most systems are designed reject forms that are not almost exactly parallel with the guide or rail. Typically, forms that are not parallel to the guide or rail cause the scanner to stop, or at least cause the form to be rejected, so that the form must be read again.

Similar to skewed forms, if the optical read head is not exactly perpendicular to the guide or rail, the vertical location of response positions adjacent to the timing tracks will correspond closely to the vertical locations processed by the system, while response positions at the opposite edge of the form will be in locations increasingly different from those processed by the system.

Solution to the above problems have been proposed by Kamada, et al. (U.S. Pat. No. 5,099,340) and by Kits (U.S. Pat. No. 5,291,592). Forms are printed with timing tracks on both edges of the paper so that the vertical locations of all marks are defined by the lines connecting corresponding marks on opposite edges. In a similar manner, timing tracks are printed at the top and bottom of each sheet so that the horizontal locations of all marks are defined by the lines.

Locating the Target with Bi-Tonal Imaging Systems:

Some systems such as Keogh et al. (U.S. Pat. No. 5,134,669) utilize the timing tracks on traditional OMR forms to locate intended response areas in the scanned image. These systems are based on the general assumption that the digital image is an perfect representation of the paper form, such that locations in the form and image conform exactly. Such systems suffer from the potential problems with traditional OMR systems and cannot overcome skew, stretch, or other distortions of the document prior to or during the image capture process.

Others methods have been used to locate OMR positions within a bitmapped, bi-tonal image. Systems such as that exemplified in Shepard (U.S. Pat. No. 5,140,139) start with a template derived from an answer form so that the target boxes locating the response positions appear in the template in an ink that is read by the scanner. The template is scanned and the boxes located, and the coordinates of the boxes is stored in memory. The forms are then scanned and software is used to align the respondent's form with the template. Once the respondent's form is properly aligned, the OMR response positions are established by their known locations on the mask. This process suffers from the problem that, since the target is printed in an ink processed by the scanner, any marks made by the respondent on the target itself can not be used in determining whether there is an intended mark in the response area.

Still others processes, such as described in Reid-Green, et al. (U.S. Pat. No. 5,001,769) use a series of "reference marks" and then transform the image of the respondent's form to correspond to the expected image. The computer performs a bilinear transformation on each page. As a result, the stored data corresponding to all of the field coordinates is transformed, so that the computer knows where those coordinates are to be found in the data representing the scanned form.

Such a procedure effectively overcomes skew, stretch, and other systematic distortions of the form or the image of the form, but may require excessive computer resources to properly register the entire sheet.

Problems in "Reading" the Mark at the Response Position:

Another major task in processing OMR types of response positions is to determine whether to record or read what may or may not be a mark at the response position. This task is typically done through two processes: normalization and mark determination.

The first process, normalization, ensures that marks are read uniformly throughout the form. On some systems, such as shown by Apperson, et al. (U.S. Pat. No. 6,079,624), normalization is achieved by calibrating the scanner. One or more standard or reference sheets are read through the scanner, and manual or automated review is used to ensure uniformity and accuracy in the values read. This process has been used for both traditional OMR and for image scanning systems, such as shown in Sakano (U.S. Pat. No. 4,760,464).

On some systems, special hardware or software is used to examine each sheet and ensure uniformity over the entire sheet. This type of normalization procedure has the advantage of adjusting for the paper being read, i.e. if one sheet of paper is darker than another, such as might occur from lots manufactured at different times, the same mark might read differently on the two sheets if the normalization is only based on an initial calibration. It is also possible to use a normalization routine which utilizes an initial calibration followed by a refinement for each sheet.

Mark determination is the process used to make a determination of whether a mark at the response position is an intended response. Mark determination is best accomplished using the normalized readings.

Mark Determination with Traditional OMR:

Traditional OMR systems are set to recognize marks based on the extent to which the entire response position is covered with a complete, dark mark. The traditional OMR scanner determines the "darkness" of a mark at each defined position. Typically, the darkness is rated on a numeric scale from 0 to 15, with no mark at all stored as a 0 and a solid black mark stored as a 15.

Calculation of the "darkness" of a mark will generally be made for a response area with some pre-determined height and width. Often the width of the OMR area is determined by the light sensing hardware. The height of the OMR area can be determined by the width of the timing marks, by hardware or software settings, and/or by the characteristics of the light sensing hardware.

Mark Determination with Bi-Tonal Imaging Systems:

For bi-tonal systems, detecting the presence of a mark in an OMR area is generally based on counting the number or percentage of black pixels within the area of a response position.

One problem with such systems deals with the establishment of the bi-tonal image. Smudges and apparent erasures are generally converted to white, while solid marks are generally converted to black. However, there may be no difference between a light pencil mark and a smudge or erasure, so that the conversion may be in error. Since there is no discrimination between a light mark and a dark mark once the image has been converted to a bi-tonal image, stray marks through a response position can look the same as intended marks.

When the bi-tonal image is created, in many cases the printed target will be converted to black, and will increase the apparent number of black pixels within the response area if not otherwise compensated. One method of treating this situation is to "mask out", or change to white (i.e. no mark), pixels corresponding to the preprinted target. This process, however, decreases the number of pixels being utilized in determining the presence of an intended mark and removes entire sub areas within the area of the response position from consideration.

SUMMARY OF THE INVENTION

The invention is concerned primarily with the processing of OMR type marks identified from images captured by an imaging scanner. The invention relates to methods of locating and identifying OMR marks through the interpretation of a captured image of the document using a gray-scale or color captured image. The full image of the sheet is captured, and then the "target" areas for possible responses are located within the image based upon an expected location being adjusted as necessary for certain error-inducing defects in the forms or scanning process.

In one embodiment, the invention includes a method of locating an area of interest within a digital image of a form captured by an imaging scanner by locating edges of the captured image of the form within a total pixel scan captured by the scanner, then determining a sheet position parameter or parameters from the location of the edges, then adjusting the expected location of the area based upon the sheet position parameter(s).

A similar adjustment of the expected location of the area of interest can be obtained from locating key marks, tracking marks or speed marks in the image and defining an adjustment parameter based on the image location compared to the expected location of the key, tracking or speed marks.

The invention therefore provides a novel method of optical mark reading (OMR) using a digital imaging scanner, by locating edges of the captured image of the sheet or key or speed marks within a total pixel scan captured by the scanner, then determining a sheet position parameter or key mark or speed parameter, then adjusting the expected location of the OMR response target based upon the parameter(s), interrogating the darkness value of pixels within a proscribed area determined from the adjusted expected location, and making a mark determination based upon the darkness values.

The invention further includes methods of normalizing the darkness value of pixels captured from a form by an optical scanning device by defining an area of the form to examine for determining pixel normalization parameters, identifying the pixel darkness value corresponding to the least amount of light reflected within the area; determining a normalization scale such that the pixel darkness value corresponding to the least amount of light reflected corresponds to a darkness value corresponding approximately to pure black, and applying the normalization scale to the recorded darkness values to create normalized darkness values. A similar method can be employed using the darkness value of pixels reflecting the greatest amount of light in the area and determining a normalization scale corresponding to pure white. Alternatively, both least and greatest vales can be used to create a normalization scale. Similar methods can be used for color scale other than gray.

The invention further relates to methods to precisely convert intended response marks to data through an analysis of the relative darkness of the pixels in the target area to determine if a mark is an intended response.

Although the invention is primarily directed at processing OMR marks, the methods and apparatus can be used to provide bar code conversion, hand print recognition, OCR, and storage of clipped images.

BRIEF DESCRIPTION OF THE DRAWINGS

FIG. 2 shows two examples of "Predetermined Response Matrix" specifications (PRMs); one PRM is appropriate for forms that have timing tracks, while the other is appropriate for forms printed with a series of key marks to locate a matrix of response positions.

FIG. 3 shows improper responses made by respondents and an alternative PRM response position definition that can permit identification of these intended responses.

FIG. 6 shows a form with enhanced timing tracks.

FIG. 8 shows proximity weights and corresponding pixel weighting matrix used to determine total mark intensities.

DESCRIPTION OF THE PREFERRED EMBODIMENTS

The invention is described in embodiments for processing OMR response forms with an imaging scanner to identify and resolve intended response marks on the form. The steps utilized in the preferred embodiment to process the form for intended marks are summarized in FIG. 1.

Figure 1:
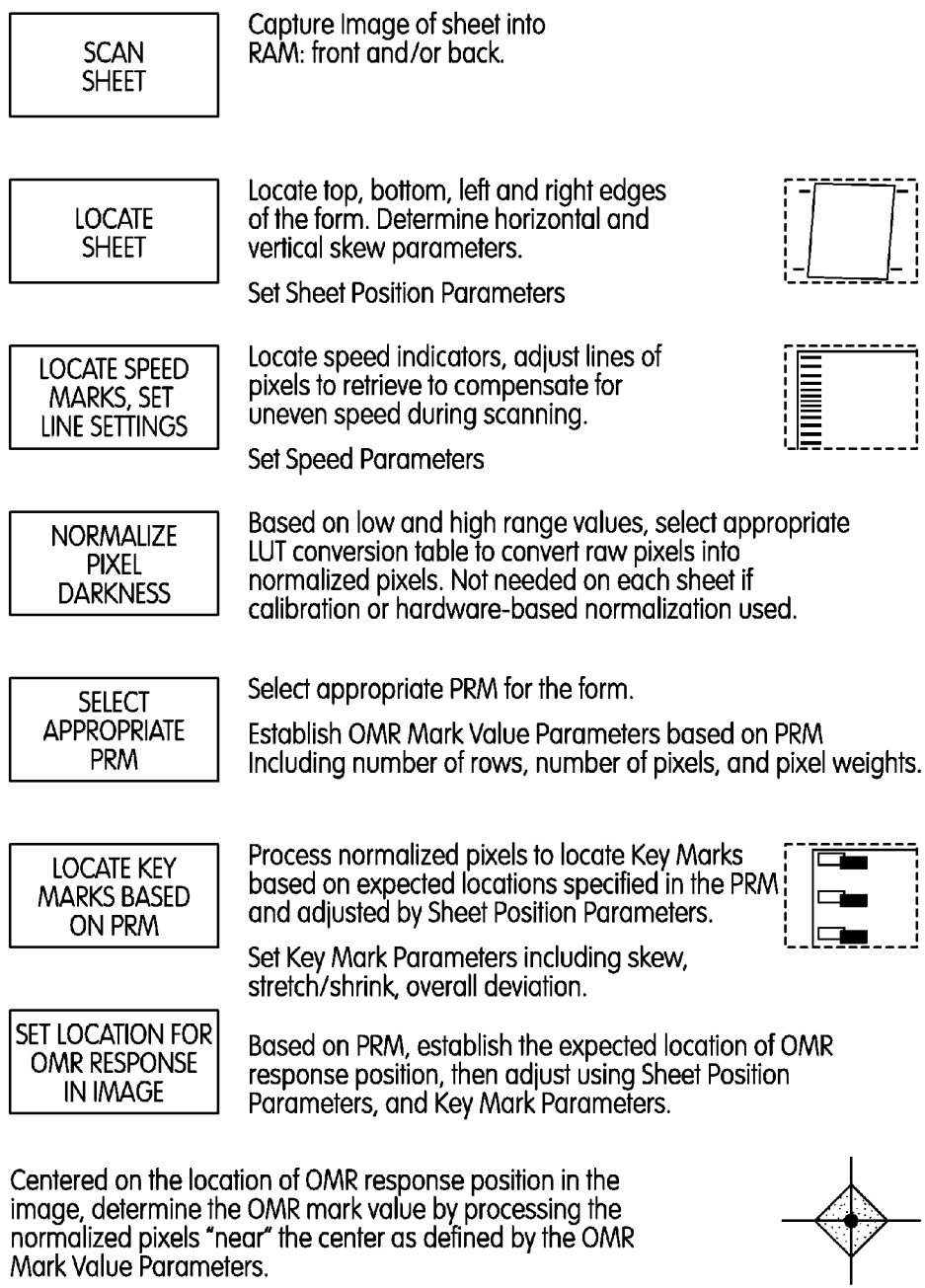
FIG. 1 shows the steps used to resolve an OMR response position using a preferred form of the invention.

While this preferred embodiment uses the FIG. 1 set of steps: including locating the sheet, speed marks and key marks in the image to determine parameters with which to adjust the expected location of an OMR target or other area of interest, an adjustment to the expected location could be made from any of the parameters alone or in different combination.

Further, the steps for normalization of pixel values described herein can also be used with a traditional OMR scanning device.

The invention provides methods to locate OMR response positions within scanned images of a response form. The methods relate to the calculation of parameters to locate the OMR response positions. In one aspect, the invention provides a two-stage process for calculating the parameters. In the first step, the image of the physical sheet is located within the total scanned image area and the physical "skew" of the document as well as physical stretch or shrink in both vertical and horizontal dimensions are calculated. The location, stretch/shrink, and skew are used to set the "Sheet Position Parameters".

In order to perform the second stage, the system must have some method of knowing the "expected" location of critical pre-printed marks on the form and some method of knowing the "expected" location of response positions that might be needed. In the current preferred embodiment of this invention, these expected locations are determined through the use of "Predetermined Read Matrix" specifications, or "PRM"s. These PRMs are based upon the intended format of the form and the concept of an "idealized captured image" of the form. The idealized image assumes that the physical form actually being scanned corresponds exactly to the dimensions and layout of the intended form, i.e. perfectly registered printing, exact sizing, and no shrink/stretch or other distortion from humidity, crumpling or other source. The idealized image further assumes perfect quality control of the scanning process, i.e. no sheet skew, no scanning angle or distance errors, no distortion caused by scanning speed variances, and the like. Thus, the idealized captured image corresponds to the image that would theoretically be captured if the perfect form is scanned by the perfect scanning process. The PRM specifications for the "expected" location of areas of interest in the captured image are based upon this idealized image.

As used in this context, an "area of interest" is an area of the form or image encompassing scannable information such as key marks, timing marks, bar codes, OMR response targets, signature lines, machine printed text or handwritten responses.

In the second stage, predetermined marks are located within the image. These marks can be timing tracks such as used with traditional OMR, and/or location marks or "key marks" to provide reference points anchoring the response positions. While these timing marks and key marks are typically solid rectangles, the system can utilize other printing on the form including text, graphics, or, in the case of color images, even the targets printed to show the respondent where the marks are to be made. Once these marks are located, the observed locations of these marks and the "expected" locations of these marks are used to calculate parameters to show the overall horizontal and vertical shift of the image relative to its expected location, calculate parameters to show the "skew" of the image, and calculate parameters to show the stretch or shrink in vertical and horizontal dimensions. Together these parameters are referred to as the "Key Mark Parameters".

The Sheet Position Parameters and the Key Mark Parameters are used to adjust the expected locations of OMR response areas to the actual positions of response areas within the image, in effect adjusting each location from its expected position to its actual position within the image. In the preferred embodiment, the expected locations are derived from information in the PRMs. The process of calculating the locations need not be done for all possible OMR locations within the form, but need only be done when it is necessary to determine whether there is an intended mark in a specific OMR response location.

In certain circumstances, such as when a document has been scanned with unreliable uniformity of speed through the scanner, an extra step may be added. In this step, the form is checked for inconsistencies in the number of lines scanned per inch of the form. When a form is moving slowly, there are relatively more scan lines per inch, and when the form is moving quickly, there are relatively fewer scan lines per inch. By using timing tracks, multiple marks spaced from the top to the bottom of the form, or by using evenly spaced "speed tracks", calculations are made to identify non-uniformity in the number of scan lines per inch, and special "Speed Parameters" are calculated and saved to make appropriate adjustments in the expected location of OMR response positions. Such an extra step is most likely to be required when the document has been scanned by an inexpensive scanner that moves the paper past the read mechanism such as when the document is scanned by a facsimile machine.

While the preferred embodiment of this patent uses "Sheet Position Parameters", "Key Mark Parameters", and "Speed Parameters" to adjust the locations of the anticipated OMR response positions, other classifications of parameters can be calculated and used to accomplish the same results.

Reading a Mark:

The invention provides a better system of determining whether the respondent intended a mark.

In the preferred implementation, either before the locations are set or after, normalization parameters are set for each hardware pixel used. If the hardware provides uniformity in the pixels throughout the form and over all sheets processed, normalization parameters can be set to default values. If the hardware and paper provide consistent results from sheet to sheet, the normalization parameters can be set based on one or more reference sheets. Normally, however, the normalization parameters are set by a normalization routine processed on each sheet.

During the normalization routine, the range of values is examined for each pixel corresponding to the hardware image capture device. Covering, for example, one inch of the form, the normalization routine identifies the "whitest white" and the "darkest black" values for each pixel. These values are then adjusted to prevent such parameters from being overly extreme and are stored as the normalization parameters. For each hardware pixel, these parameters are used to convert the "raw" values obtained from the hardware into "normalized" values. When applied to an entire sheet, these normalization parameters make unmarked areas in the sheet uniformly white while making the darkest marks uniformly black.

When pixels are processed for any function except locating the physical document, the normalized values are used so that variances in the paper, light source, hardware receptors, and the like are compensated for, leaving only variations due to the relative presence or absence of a mark for each pixel. If bi-tonal values are required, such normalized pixels can be converted into bi-tonal values through the use of a single cutoff value: all normalized pixels "lighter" than the cutoff are set to white, and all normalized pixels "darker" than the cutoff are set to black.

The system can use two inks in the same manner as with traditional OMR. The first ink is used to locate the targets or response positions for the respondent, and the second color is used to print the key marks, track marks, form identification marks, and the like. When two inks are used, they must be in registration with each other. Unlike traditional OMR, however, the two inks do not have to be precisely aligned with a reference edge of the paper.

When the image is in color, the system can utilize a single color both for location key marks or tracks, and for defining the targets. For example, using a form printed in red ink only, the identification of marks or tracks can be based on the absorption of red light while the determination of marks within the OMR response positions can be done excluding consideration of red.

The system uses the located OMR response position to define the center of the OMR response area. Then, using parameters to set the height, width, and other characteristics of the response area around the center of the that same response area, the system uses the pixels within the area to determine the relative "intensity" of the mark. This intensity can utilize both the percentage of the pixels which individually indicate the presence of a mark, and/or the relative darkness of individual pixels within the area.

The methods described herein permit significant savings in the design and production of response forms This means that printed key marks and response targets need only be relatively close to the locations defined in the Predefined Read Matrix. In the initial implementation of this invention, deviations of up to 0.125 inches are acceptable for the overall placement of the form and variations of .+-0.5% or more in height/width of the overall image are acceptable. Across the columns of response positions on a given line, the response positions should be uniformly spaced. When timing tracks are used, each line of response positions should be at right angles to the line of the successive timing marks. When timing tracks are not used, the lines of response positions should be uniformly spaced within a section defined by a PRM. When two colors are used, the design should have proper registration among the colors.

For traditional OMR, only specialized printing plants are capable of consistently and reliably producing quality scannable documents because of the strict requirements of registration and dimensionality. In order to meet the strict standards of traditional OMR forms, almost all forms are printed using multi-station web presses and special papers. With the improvements in this invention, standard printing presses can be used. Most professional printers are capable of keeping two or more colors of ink properly in register and a wide variety of multi-color printing presses can produce forms applicable for this invention. Forms can be printed using continuous printing techniques or cut-sheet techniques. Forms can be printed on paper already trimmed to the final size, printed and trimmed to final size at the same time, or printed and subsequently trimmed to size. Forms printed on both sides can have both sides printed during a single run, can be done by work-and-turn, or can be printed at different times.

For very small quantities of forms, inexpensive color inkjet printers and/or color laser printers can be used in lieu of professionally printed forms. Scannable documents are designed and printed with primarily red ink defining the targets and ink with substantial blue, black, or green components used to print the key marks. Respondents can then mark the form with blue, black, or green pen, ballpoint, pencil or marker. Once the forms have been filled in, they are scanned using a monochrome image scanner with hardware set to process visual spectrum light excluding red. As a result, the response targets that are printed in red do not appear in the digitized image of the form but the key marks and respondent marks do appear in the digitized image. Alternatively, a color scanner can be used to read the form and software used to filter out the red ink used to show the respondent where to make the desired mark.

For larger quantities, most professional printers are capable of keeping two or more colors of ink properly in register and a wide variety of multi-color printing presses can produce forms applicable for this invention. With the use of color scanners, even greater savings can be realized as the scannable document can be printed in a single ink color, or in multiple colors with little regard to color registration. In the preferred embodiment of this invention, both the key marks and the target response positions are printed using a single color, specifically red or near-red. In the step to identify the key marks, software settings are set so that red or near-red marks appear as dark pixels in the set of normalized pixels. Once the key marks are located, and prior to determining whether there are marks made by the respondent, the software settings for normalization are changed so that the red or near red areas on the form appear as unmarked pixels in the set of normalized pixels. While the preferred implementation of this process is based on red, other colors can be used in a similar manner.

This process, then, means that there is only one critical color in the document. If a second color is used, it need not be in registration with the first. Such forms can be inexpensively produced using any means above as well as with single color presses. Even if two or more colors are required, the additional second colors can be added at the same time or at a later time. All of the production options listed above are available so that the least expensive printing techniques can be selected.

Barcode Conversion:

The same procedures used to locate the OMR response positions can be used to locate barcodes to be converted into text. Once the area that should contain a barcode is located, the OMR response positions within that area can be converted and checked for the presence of a mark in that area as shown in Poor (U.S. Pat. No. 5,452,379).

OCR:

The same procedures to locate the OMR response positions can be used to locate areas containing machine printed text characters to be converted into text. Once the area that should contain printed text characters is located, the OMR response positions within that area can be converted and checked for the presence of a mark in that area as shown by Poor (U.S. Pat. No. 5,452,379).

Handprint Recognition:

The same procedures to locate the OMR response positions can be advantageously used to locate areas containing handwritten characters that need to be converted into text. Once the area that should contain handwritten characters has been located, the OMR response positions within that area can be converted and checked for the presence of a mark in that area as shown by Poor (U.S. Pat. No. 5,452,379).

Clipped Images:

The same procedures to locate the OMR response positions can be advantageously used to locate areas containing images that need to be saved. Such "clipped" images can be used for a variety of applications including security such as verification of signatures, "key from image" data entry, and the scoring of open-ended assessments as shown by Poor (U.S. Pat. No. 5,672,060). Once the area that should contain the image is identified, the OMR response positions within that area can be converted and checked for the presence of a mark in that area as shown by Poor (U.S. Pat. No. 5,452,379).

PRM Specifications for Response Forms:

A preliminary stage in the assessment testing is to design the response forms. The general characteristics of the form are specified by one or more PRM (Predetermined Read Matrix) specifications. Then forms are printed corresponding to the PRM(s) and the characteristics of the hardware that will be used to scan the forms.

FIG. 2 shows examples of two basic types of PRM specifications. The PRM in the left column defines "track-based" definitions, while the PRM in the right column defines a matrix of response positions anchored to specific key marks encompassing three sections of the form. The initial portion specifies global information for the PRM including the size of the key marks and the size of each OMR response area. Then, for each section within the PRM, a separate PRM Section is defined specifying horizontal and vertical locations of key marks and OMR response positions. For the track-based PRM, the number of rows is derived from the number of track-marks identified and the vertical location of each response positions is defined relative to the center of the corresponding timing track. For the matrix-based PRM, the number of rows and columns are both specified for each section and a matrix of OMR response positions is anchored relative to the key marks.

The initial implementation provides extreme flexibility in the definition of PRMs. PRMs can be based on timing tracks and track-based rows of OMR responses, key marks and matrix specifications of OMR responses, or a combination of both on the same form. The number of OMR response positions across the form can vary in different PRM sections within the same form. The same area can even be defined as containing OMR response positions from two or more different PRM section definitions.

Turning now to FIG. 3, the first part of the figure shows improperly made response marks that will not be recognized as intended marks by traditional OMR devices or by an image scanning system when using only the PRM specified in designing the form. However, a larger area of interest on the form can be defined with multiple PRMs. The section of the form shown can be processed using a second PRM with oversized OMR response areas. If no mark is found in any of the valid response positions using the smaller response positions corresponding to the printed targets, the oversize response positions can be interrogated using the second PRM to identify possible intended marks such as those shown.

Figure 5:
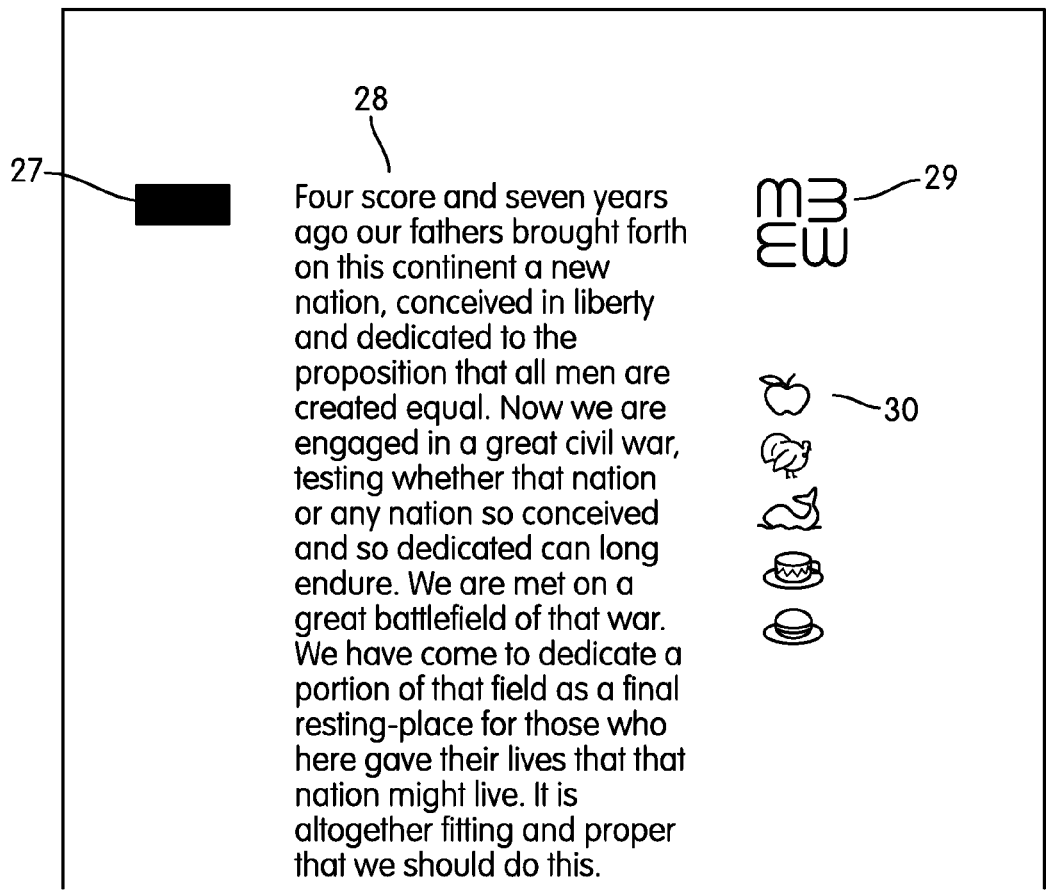
FIG. 5 shows various marks or items that can be used as key marks including track marks.

As shown in FIG. 5, timing tracks and key marks may be rectangular (6), or may be other printed elements such as text (7), logos (8), or decorative elements (9).

As long as the printed form corresponds to the appropriate PRM and the dimensions are close (approximately .+−0.5%), the system described herein can compensate for deviations from expected location in terms of overall placement on the sheet, alignment to the sheet, and size of the printed form in horizontal and vertical dimensions. When forms are printed on both sides, each side is treated independently so that there are no constraints concerning the alignment of the front to the back.

Capturing a Digitized Image of a Sheet:

As shown in FIG. 1, the completed form is scanned by the optical scanner and a digitized image of the completed form is captured. In a preferred embodiment, a scanner should capture pixels with at least 120 pixels across the form and captures rows of pixels at least 120 rows per inch down the form. In an embodiment using infra-red scanning, each pixel is captured as a gray scale from 0 to 255, where 0 represents a pixel location where essentially all of the infrared light was absorbed, and 255 represents a location where essentially all of the infrared light was reflected off of the form into the scanning device. In an embodiment using full color visual spectrum, full color images are typically stored as triads of values with separate values for red, blue, and green or for cyan, magenta, and yellow, with each value stored as an intensity varying from 0 to 255.

The captured image is stored in RAM of the host computer or within memory of the scanning device. Pixels are extracted as needed from the captured images. A density of 120 DPI is preferred, although the hardware can scan and capture the image in some other density such as 200 DPI, 240 DPI, or 300 DPI. When an image is captured at 240 DPI there are four times as many pixels in the image as in the preferred DPI, and when an image is captured at 300 DPI, there are more than six times as many pixels.

When the image is captured at 120 DPI, the extraction routine merely points to the first requested pixel within the captured image. If, however, the image is captured at any other density, the extraction routine selectively sets a vector of pixels as they would have been if the form had been scanned at 120 DPI and returns a pointer to the vector. The process to extract such pixels uses standard imaging techniques, but, because the image itself is not converted, this process uses only a fraction of the time that would be needed either to convert the entire image to a 120 DPI representation of the captured image, or to utilize all of the captured pixels for the procedures.

Figure 7:
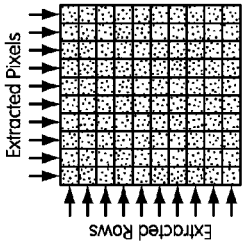
FIG. 7 shows the extraction of 120 DPI rows and pixels from images scanned at various densities.

In converting from one metric to another in image processing it is desirable to use weighted or interpolated values. The process used in this invention uses unmodified captured pixels as often as possible to reduce computational requirements. FIG. 7 shows pixel extraction rules for 120, 200, 240 and 300 DPI. For 200 DPI, two sets of rules are shown. The first, the Raw Pixel Method, provides rapid extraction with some distortion. The second uses weighting, or interpolation procedures. A similar method could be used for 300 DPI, but the distortion caused by using only the raw pixel method to convert to 120 DPI is minimal.

If, for design or technical reasons, the form is designed to be read through the scanner upside down, the system is notified that the form is "flipped". For flipped images, the system automatically adjusts the pixels that are returned to go from the bottom up, from left to right, so that the image processed is upside up. However, processing is significantly faster if the forms are turned upside-up with appropriate PRMs for upside up processing, rather than using the computational cycles to "flip" the form.

Hardware Skew:

Some scanners capture a slightly distorted image in which the right side of each line represents a location on the original document slightly higher or lower than that on the left side. This can be caused by a read mechanism that is not at right angles to the path of the paper, or may be a function of the time it takes to sample the pixels across one line of the image. In a preferred embodiment of this invention, such hardware skew is detected through processing of unaltered captured images, and then an appropriate skew parameter is entered into the system to adjust the expected locations of response targets. The default value of the skew parameter is zero. The observed value can be entered in the control.INI file or manually entered into the system settings as the number of pixels shifted up (positive) or down (negative) per inch, which is equivalent to the number shifted per 120 pixels. This value is stored as a Sheet Position Parameter.

Locating the Edges of the Form:

Unless provided directly by the scanning hardware, the first process applied to a scanned image is to locate the image of the scanned sheet within the total pixel scan, as shown in FIG. 1 (3). Some scanners will start to store the image before the start of the form and continue beyond the end of the form, while others will only store lines of image data when the form itself is detected by the hardware. If not available from the hardware, the top and bottom edges of the form are located using standard imaging techniques, such as by interrogating the captured pixel values at approximately 1' intervals spread out from the middle of the captured image traversing the captured image from the top down and from the bottom up. The location of the top and bottom edges of the form are saved as Sheet Position Parameters.

Figure 4:
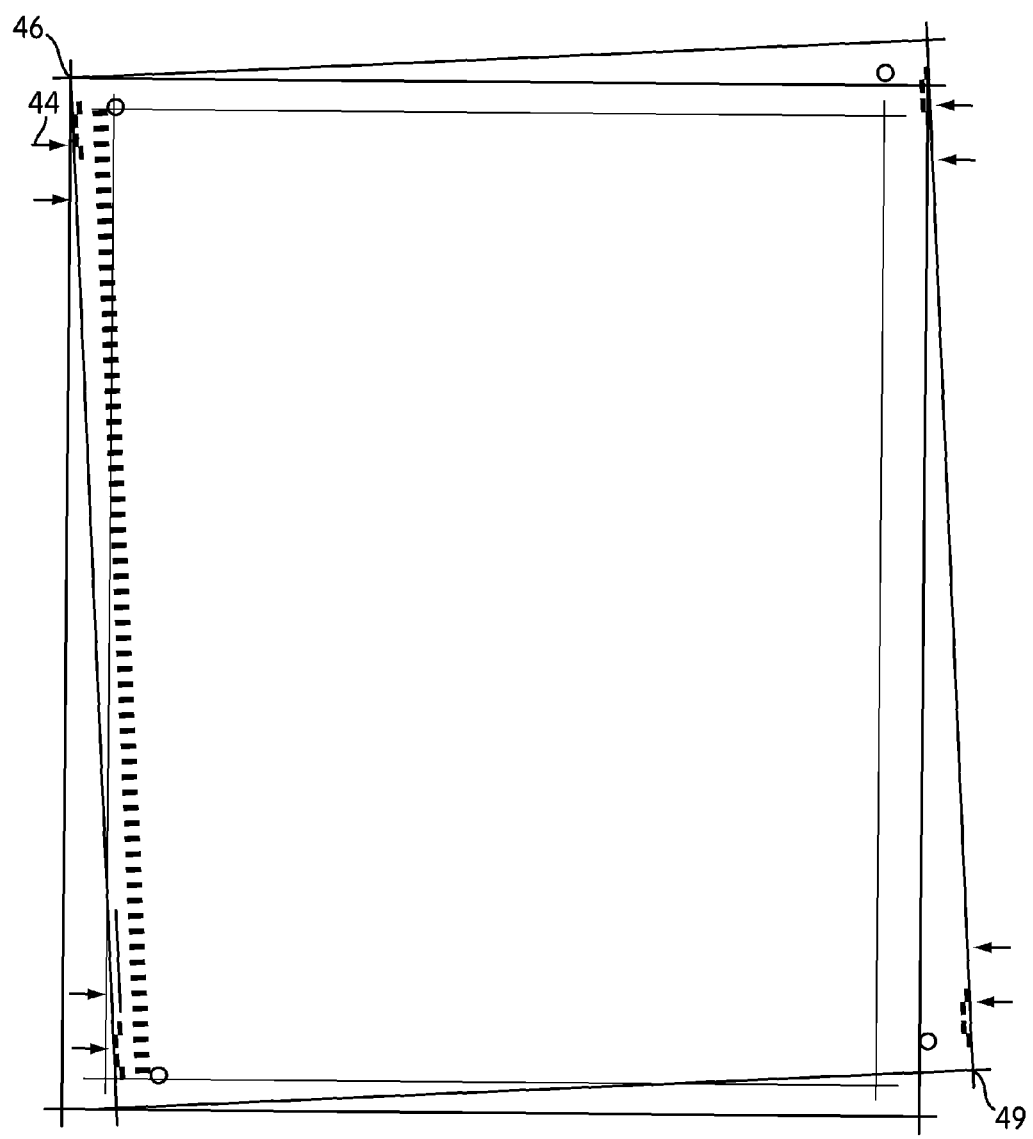
FIG. 4 shows distortions in locations of OMR positions as a result of skew.

After the top and bottom of the form are located, the left and right edges of the form are located. Many scanners will store an image based on a fixed number of pixels which normally extend beyond the edges of the form itself. The left and right edges of the form are located using standard imaging techniques, such as interrogating the captured pixel values for two lines near the top and also for two lines near the bottom and traversing the captured image from the left edge to the right and from the right edge to the left as shown in FIG. 4. Once the left and right edges have been located, the leftmost and rightmost extremes (12 and 13) are saved as Sheet Position Parameters.

The skew of the sheet is calculated and saved as a Sheet Position Parameter for the left and right edges. For the left edge, the horizontal skew can be defined as the change in the location of the edge from left to right in terms of the number of pixels of change per inch which is equivalent to the number of pixels shifted left or right per 120 lines. The vertical skew can be defined as the change in location of the top of the form from top to bottom in terms of the number of pixels per inch which is equivalent to the number of pixels shifted up or down per 120 pixels. The horizontal and vertical skew are stored as Sheet Position Parameters.

Speed:

In most cases, the scanning systems provide a fairly uniform speed of the paper through the scanner. If needed, however, speed adjustments can be made as shown in FIG. 1 (third box from top). In the preferred implementation of the invention, adjustments for the speed of the paper are performed prior to normalization and the identification of key marks, even though a given mark may be used for both speed and as a key mark or track mark for a PRM.

If adjustments for speed are required, the system locates the speed indicators on the form using standard imaging techniques, primarily edge detection based on a linear ramp traversing the form from the top line of captured image to the bottom line of captured image. The line on which a speed indicator first occurs is recorded. If the difference between the recorded lines is constant for each successive speed indicator, then the speed of the form was uniform. If there are deviations, then the speed increased or decreased as the form was scanned and speed adjustments are needed.

If speed adjustments are needed based on the observed deviations, a lookup table is constructed showing a row number within the captured images to be retrieved for each "nominal" row within the captured image, and the table is stored as a Sheet Parameter. When the image is captured in a density higher than 120 lines per inch, this adjustment is made by adjusting which lines in the captured image are retrieved to provide a 120 lines per inch equivalent.

By determining any speed adjustment prior to normalization, the system ensures that normalization processes will be determined by and applied to the same retrieved captured pixels that will be used for subsequent processing.

Normalize Pixels on the Sheet:

Normalization is a process through which the darkness value of pixels within the captured images are adjusted so that white paper is represented by the same value throughout the form and black marking is represented by the same value throughout the form.

If the hardware provides uniform pixel representation, this step can be bypassed. Otherwise normalization parameters can be fixed using a configuration process, or, as shown in FIG. 2 (5), recalculated for each sheet. In the preferred implementation, each sheet is normalized by examining a series of lines from near the top for approximately one inch. Based on this investigation, the highest (closest to white) value is calculated for each pixel within the range of pixels for which normalization is needed. This same process could be used to determine the black end of the normalization range.

To perform the normalization, each pixel is assigned to a predefined lookup table. Each lookup table has a different number of entries: the lowest entry is zero for black, and the highest entry is 255 for white. A pixel is assigned to the table with the number of entries corresponding to the difference between the highest and lowest pixel values as determined above. To convert an observed pixel into a normalized value, the deviation from the lowest value is used as an index into the table and the value at that entry is the normalized value. This process permits a rapid conversion from captured images into normalized values.

It is only necessary to normalize those pixels that are actually used for subsequent processing, and the actual conversion to a normalized value is only performed when it is required. The preferred implementation determines the normalization parameters, i.e. the lowest and highest values and the appropriate lookup table, for all pixels within the range of pixels for which normalization is needed.

For the remainder of the operations, a special function retrieves vectors of pixels from the captured images. In the preferred implementation, this function returns a pointer to a vector of normalized pixels at 120 DPI using the extraction procedures shown in FIG. 7 and the normalization procedures outlined above. If the scanner normalizes the pixels, the function returns a pointer based on the captured images. Otherwise the function creates a vector of pixels which are captured image pixels normalized as just described.

Calculate Area of Interest Location Parameters:

An aspect of this invention is determining the location of OMR response areas and other areas of interest in the captured image. This process is controlled through the stored PRMs. Locations within the PRM are specified relative to the top of the form and relative to the right or left edge of the form. The top of the form is located at position "0", and most vertical positions are specified relative to the top in units of 120 per inch. If relative to the left edge, the left edge is located at position "0" and all horizontal positions are specified relative to the left in units of 120 per inch. If relative to the right edge, the right edge is assigned position "0" and all horizontal positions are specified as negative deviations from the edge in units of 120 per inch. Within the PRM, there are one or more sections that are defined in terms of tracks or in terms of multiple key marks that anchor any given area. Each section of the PRM is processed separately.

Based on the active PRM, 'expected' locations are determined for key marks or timing tracks, and the system adjusts these expected locations through the Sheet Position Parameters as shown in FIG. 1 (7), and then processes the captured image to locate the key marks or timing tracks in the adjusted area.

Once the key marks or timing tracks are located, their locations are used to set Key Mark Parameters which include overall deviation from expected location, vertical skew, horizontal skew, vertical location stretch, and horizontal stretch. Different Key Mark Parameters are calculated depending upon the characteristic of the PRM section being processed.

If the section is based on timing tracks, the section typically contains only one "key mark" specification—that of the timing track. For the timing track, the vertical position is specified as zero, indicating that it can appear anywhere vertically in the form. The horizontal position sets the nominal distance (in 120 DPI) from the left edge (positive value) or the right edge (negative value). Additional parameters set the critical edge position of the track as its left edge, right edge, or center. Based on the nominal distance from an edge, the system examines the captured image for the presence of a timing track starting at the top of the captured image and traversing down. The examination is done at several points to the left and right of the nominal location to account for the possibility of the track being shifted to the left or right of its expected position. When a track is located, its exact position is determined by standard image processing techniques. Each time a track is identified, the expected horizontal location is changed to the observed location prior to searching for the next track. Additionally, the skew in the Sheet Position Parameters can be used to adjust the expected location of timing tracks by adjusting the expected location left or right based on the value of the location skew.

Once all of the timing tracks have been located, the skew or tilt of the captured image is calculated based on the change in the horizontal position of the tracks at the top to the horizontal position of the tracks at the bottom. While there are several methods to calculate such a skew, in the preferred embodiment, the skew is calculated based to the first and last timing track only and this "track skew" is expressed as the number of pixels that the tracks drift left (negative) or right (positive) per inch which is the same as per 120 lines.

Once the "track skew" is identified, it is used in conjunction with the hardware skew to determine the vertical skew. Since each line of OMR positions should be at right angles to the line of timing tracks, the vertical positions should go up (positive) or down (negative) at the same rate that the horizontal positions shift right or left so that the total vertical skew is the sum of the track skew plus the hardware skew.

Enhanced Timing Tracks:

In the standard timing track processing, the vertical spacing of the OMR response positions and other areas of interest are based on the observed locations of the timing tracks. The horizontal spacing, however, is based primarily on fixed values. In a preferred implementation of the invention, these fixed values are stored in the PRM section specifications. Further, the vertical skew is derived from the horizontal skew. An enhanced version of timing track processing includes methods to observe the horizontal spacing and the vertical skew.

Figure 6:
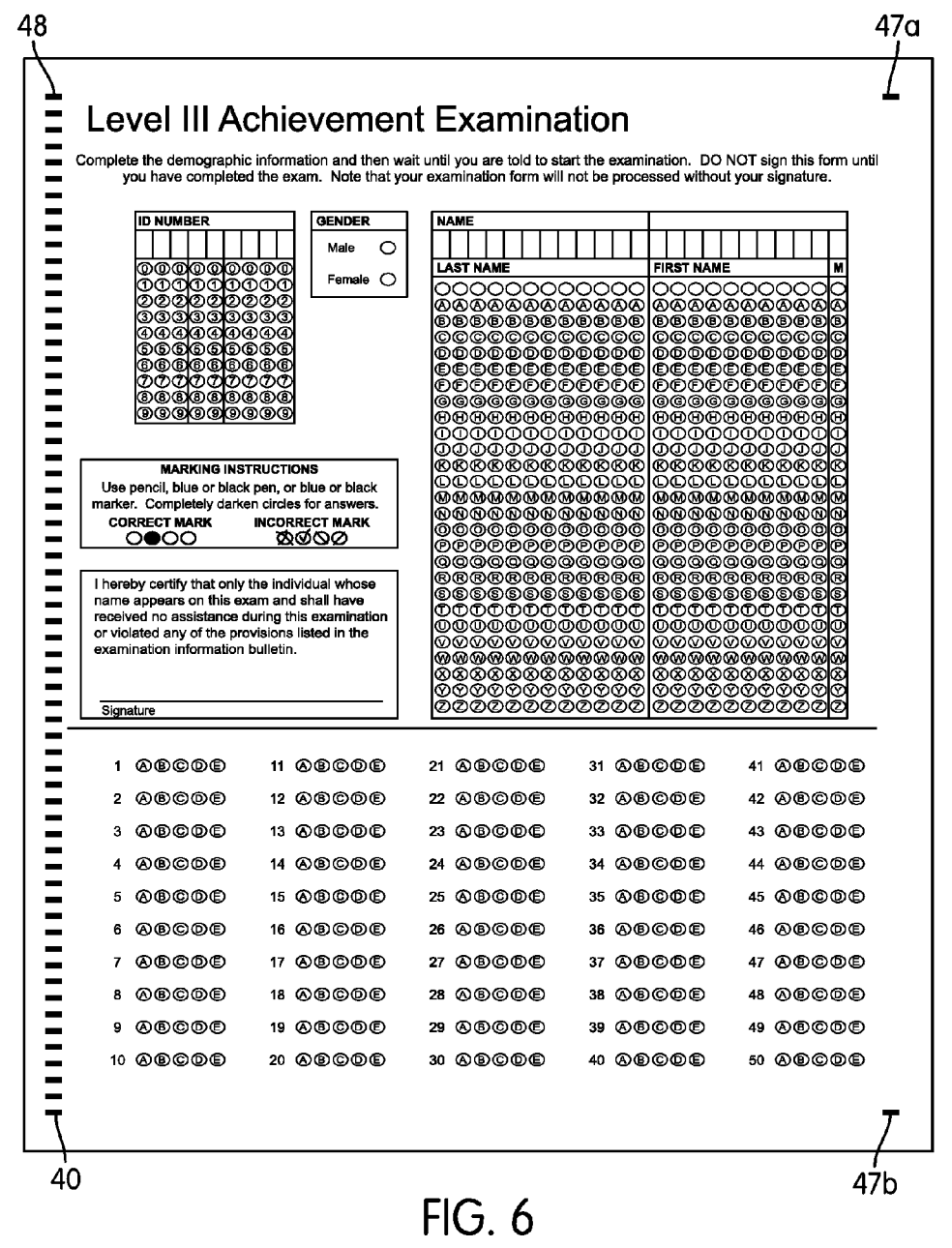

In the preferred implementation, these observations are based on the additional key marks in the PRM section definition, typically located at the opposite edge of the form from the timing tracks. As shown in FIG. 6, these additional key marks are typically mirror the first (48) and last (40) timing mark. The vertical deviation from the first timing track to the corresponding opposite edge key mark is used to determine the vertical skew. The distance from the timing track to the opposite edge key mark is used to show the horizontal deviation from expectation over that distance, and is used to calculate a horizontal stretch adjustment. These calculated parameters are stored as Key Mark Parameters.

Matrix Based PRM:

For a matrix based PRM, both the vertical and horizontal stretch and skew are based on observations. Multiple key marks are specified, typically at the top and bottom of an area and with marks near both the left and right edges such as shown in FIG. 2. In the preferred embodiment, section definitions within the active PRM specify the locations of the key marks relative to the top of the form and relative to the left or right edge of the form. As with the track-based processing, based on the PRM specified distance from an edge, the system examines the captured image for the presence of the key marks starting at the vertical position specified in the PRM and traversing up and down within the captured image to account for the possibility that the mark may be in the captured image higher or lower than expected. The examination is done at several points to the left and right of the specified location to account for the possibility of the key mark being shifted to the left or right of its expected position. When a key mark is located, its exact position is determined by standard image processing techniques. Each time a key mark is identified, its deviations from its expected horizontal and vertical locations are stored and the expected horizontal and vertical locations of subsequent key marks are adjusted accordingly. Additionally, the skew in the Sheet Position Parameters can be advantageously used to adjust the expected location of key marks by adjusting the expected location left or right, up or down.

Once the key marks are located, their observed locations and deviations from the "expected" locations can be used to set the Key Mark Parameters including horizontal and vertical stretch and skew.

Locating OMR Response Locations:

As shown in FIG. 1 (bottom box), based on the appropriate PRM section, the nominal location of each OMR response position is specified. Then this nominal location is adjusted by using the calculated parameters so that the expected location of the OMR response position within the captured image is known.

Timing Track PRM Section:

For timing track based PRM sections, nominal locations of the OMR positions corresponding to each track mark are calculated based on the vertical location of the timing track and the PRM section definition. For each OMR response position corresponding to a timing track, the nominal vertical position is the vertical position of the track plus the offset specified in the PRM specification. The horizontal position of each OMR response position is calculated from the PRM definition in terms of pixels (at 120 DPI) from the reference edge and adjusted right or left by the deviation of the timing track from its expected position to its observed horizontal location. The same procedures are used to obtain the nominal OMR locations for enhanced timing track PRM sections.

Matrix Based PRM Section:

For matrix based PRM sections, nominal locations of the OMR positions are based on the location of the upper-left key mark and the settings in the PRM section definition. The horizontal nominal location of each OMR response position is calculated from the PRM definition in terms of pixels (at 120 DPI) from the reference edge and adjusted right or left by the deviation of the first key mark from its expected position to its observed horizontal location. The vertical nominal location of each OMR response position is calculated from the PRM definition in terms of pixels (at 120 DPI) from the top edge and adjusted up or down by the deviation of the first key mark from its expected position to its observed vertical location.

Locating OMR Response Positions in the Image:

In the preferred embodiment, two steps are required to obtain a desired "goodness of mark" for any specified OMR position. First the location of the response area within the captured image must be found, and then the "goodness of mark" must be calculated based on the normalized pixels within that located area.

The "nominal" location of each OMR response position is determined by the active PRM for the captured image as described above. Once the nominal locations are located, for each OMR position, the actual horizontal and vertical locations are set by adjusting the nominal locations by the calculated parameters including the Sheet Position Parameters, the Speed Parameters, and the Key Mark Parameters. These parameters permit adjustment for horizontal and vertical stretch and skew as well as adjustments for the location of the form within the captured image.

The calculation of the nominal positions can be performed prior to applying the location parameters, or the final expected locations can be calculated using information from the PRMs and the location parameters concurrently. The separate calculation of nominal locations is provided for ease in explanation, and, in the preferred implementation, only the final expected location within the image is calculated.

The calculation of the final locations of each OMR response position can be done for all OMR response positions at one time, or the calculation can be deferred until a particular OMR response position is needed. In the preferred embodiment, the final locations for all OMR response positions are set immediately after locating the appropriate timing tracks and/or key marks. In applications with sparse use of OMR response positions, it may be faster to defer such calculations until needed.

Determine Mark Values of OMR Response Positions:

In the preferred embodiment, each possible OMR response position is defined as a matrix of rows and columns and represented in a two-dimensional array of values. Upon reading the sheet, each value is set to an "undefined" state. If the application requires processing of a particular response position with the corresponding array value set as undefined, its "goodness of mark" or "intensity" is calculated using the methods shown below and stored in the array. Subsequent references to the OMR position use the stored value. With this procedure, only those OMR positions that are needed by the application program are converted to values. For most sheets processed, then, only a small minority of OMR read positions ever get converted into "goodness of mark" or "intensity" values, yielding significant computational savings. Once an intensity value is determined, that value is saved and referenced if it is needed subsequently rather than determining the value a second time. In applications where a given OMR response position is rarely referenced more than one time, it may be more efficient to not save the determined values but recalculate the OMR intensity value each time it is referenced.

As shown in FIG. 1, the mark value is determined by the pixels "near" the center of the OMR response position. Based on the PRM, each OMR response area is defined as a sub matrix of pixels within the captured image, with the width given as the number of pixels, and the height given as the number of consecutive number or rows of pixels. In the preferred embodiment, the response area is centered around the final response position within the captured image.

Pixels within this area are classified by their proximity to the center of the OMR response area as shown in FIG. 8 with the area composing a set number of rows and columns. In the example, each OMR response position consists of 9 rows and 9 pixels. The count of the number of pixels in the response area define the "total pixel area". A vector of weights (51) is provided that is applied to each pixel's horizontal and vertical proximity to the center of the OMR position. In the example, pixels near the center have more weight than those farther from the center. One alternative table with all unity values would give all pixels throughout the total pixel area the same weight. A lookup table is provided to convert each normalized pixel value (from 0 to 255) to an OMR contribution value (from 0 to 15). Each pixel within the response position is converted to an OMR contribution value which is multiplied by both the horizontal and vertical weight for its position relative to the center of the OMR response positions. The product of the horizontal and vertical weights are shown for the pixel weight table given for each pixel in the pixel area (51). The sum of all such weighted contribution values is calculated. At the same time that the sum is calculated, counters are incremented to get the number of pixels within predefined ranges such as no mark, light, medium, and dark. The final "intensity" value for the OMR read position can be derived from any of a multitude of formulas using these accumulations.

In the preferred implementation, the intensity determination utilizes only the sum of the weighted contribution values as a percentage of the maximum possible sum with the percentage converted to a final value through the use of a lookup table. The size, weights, and lookup tables can be adjusted so that this procedure closely approximates any traditional OMR device.

An alternative final value based on the extent of marks within the response area utilizes counters of pixels that are medium or dark converted to a percentage of the total pixel area and then converted to a final value through the use of a lookup table. The size of the response, the specifications for what constitutes a "medium" or "dark" pixel, and the lookup tables can be adjusted so that this procedure closely approximates any bi-tonal image to OMR procedure.

The particular formula or procedure used to determine the final intensity value for each OMR read position depends on the particular application, the instructions to respondents on how to mark the form, the read characteristics of the hardware, and other considerations. The advantage of the current invention is that it provides a structure in which such determinations can be easily made and tested within the software used.

Locating Other Areas of Interest:

For other areas of interest, such as those containing barcodes, machine printed text for OCR, handprint characters, or areas for clipped image storage, the controlling program must specify the "expected" location of the area of interest. In the preferred embodiment, the location information is given as the upper left coordinates and the lower right coordinates. The vertical component is expressed as the number of lines from the top of the form (in 120 DPI units). The horizontal component is expressed as the distance in pixels from the left edge of the form (if positive), or the right edge of the form (if negative) in 120 DPI units.

The system applies the location parameters to these expected coordinates to derive the actual locations of the upper-left and lower-right coordinates of the area of interest in the captured image.

Once the barcode area has been located as defined above, several aspects of this invention can be utilized to reduce computational time needed to decode the series of dark and white bars into text characters. The first aspect that saves computational time is in having the controlling program limit the area of the sheet in which a barcode may be located so that fewer pixels need to be examined.

If custom barcode processing is implemented, this invention permits rapid identification of bars through normal image processing edge detection techniques. Such a procedure can be applied to the raw pixels or to the normalized pixels. Alternatively, the bars can be located by treating each pixel as bi-tonal, i.e. on (black) or off (white). In addition to providing raw pixels and normalized pixels, the system can provide vectors of bi-tonal representations of pixels. In the preferred embodiment, pixels are quickly converted to bi-tonal format by applying a single value cutoff to the normalized pixel: values at or above the cutoff being set as white and values below the cutoff being set as black. The system, then, can provide vectors of pixels to be converted into sequences of bars, and then the pattern of the bars can be converted into text.

An alternative procedure is to create an image suitable for a commercially available barcode software to decode. Such an image can be created in the host computer RAM and passed to a separate process to be converted into text. Typically such commercially available software requires that the image containing the barcode be bi-tonal. Using the single cutoff procedure described above, the system can provide a derived black and white image of the area of interest. In the preferred embodiment of the invention, the image will normally be created using the rows of pixels and columns of pixels as found in the captured image. When there is any skew or stretch in the captured image, the same skew and/or stretch will appear in the created bi-tonal image.

Processing OCR Areas:

Once an area containing machine printed text for OCR has been located as defined above, several aspects of this invention can be utilized to reduce computational time needed to decode the printed material into text characters. The first aspect that saves computational time is in having the controlling program limit the area of the sheet in which OCR characters may be located so that fewer pixels need to be examined.

In the preferred embodiment, the system creates an image of the area of interest suitable for a commercially available OCR software to decode. The image is created in the host computer RAM and passed to a separate process to be converted into text. Typically such commercially available software requires that the image be bi-tonal. In the preferred embodiment, pixels are quickly converted to bi-tonal format by applying a single value cutoff to the normalized pixel: values at or above the cutoff being set as white and values below the cutoff being set as black. In the preferred embodiment of the invention, the image is normally created using the rows of pixels and columns of pixels as found in the captured image. When there is any skew or stretch in the captured image, the same skew and/or stretch will appear in the created bi-tonal image.

The system provides an opportunity for improved OCR. In some cases, smudges or light areas within the printed characters result in unwanted black pixels and desired pixels being white within the bi-tonal image. If the OCR process results in less than certain conversion to text, the OCR process can be repeated multiple times using different cutoff values to derive the bi-tonal values and the results of multiple executions of the OCR process combined as the final result. Alternatively and preferably, OCR processes can be developed to act on the normalized pixels directly so that smudges and the like can be ignored, and light marks can be processed within the OCR process itself Processing Handprint Areas:

Once an area containing handprinted characters has been located as defined above, the system can control the conversion to text. In the preferred embodiment, the system creates an image of the area of interest suitable for a commercially available software to decode the handprint characters. The image is created in the host computer RAM and passed to a separate process to be converted into text.

Because the darkness of handwriting can vary significantly from individual to individual and can vary significantly depending on the writing instrument used, the preferred implementation of this invention includes the calculation of special "image normalization" parameters for the area of interest. While the normalized pixels based on the sheet will be appropriate for many instances, such as those with bold dark marks made with a dark instrument, they may be inappropriate for others, such as those with light colored pens, light pencil marks, and the like. Using the same procedures as used to normalize the entire sheet, separate parameters can be used to determine the "whitest white" or the "darkest dark" for each pixel or over the image area. In the preferred embodiment, the white values from the sheet normalization are used on a pixel-by-pixel basis, and a single darkest dark value is calculated for the image. This process permits rapid adjustment of the normalization parameters for the image with a minimum of computation.

Typically commercially available software requires that the image be bi-tonal. In the preferred embodiment, pixels are quickly converted to bi-tonal format by applying a single value cutoff to the normalized pixels with the normalization being based on the image normalization parameters: values at or above the cutoff being set as white and values below the cutoff being set as black. In the preferred embodiment of the invention, the image is normally created using the rows of pixels and columns of pixels as found in the captured image. When there is any skew or stretch in the captured image, the same skew and/or stretch will appear in the created bi-tonal image.

The system provides an opportunity for improved handprint character recognition. In many cases, smudges or light areas within the characters result in unwanted black pixels and desired pixels being white within the bi-tonal image. If the recognition process results in less than certain conversion to text, the process can be repeated multiple times using different cutoff values to derive the bi-tonal values and the results of multiple executions of the process combined as the final result. Alternatively and preferably, handprint recognition processes can be developed to act on the normalized pixels directly so that smudges and the like can be ignored, and light marks can be processed within the recognition process itself.

Processing Clipped Image Storage Areas:

Once an area for clipped image storage has been located as defined above, the system can write the desired image to the appropriate output device. In the preferred embodiment, the system writes appropriate information to the output device, typically a hard drive or display, on a line-by line basis. Alternatively, the image can be created in the host computer RAM and passed to a separate process to be saved or displayed.

The system provides options to save clipped images in several formats including TIFF and custom formats. Images can be stored with 8-bit, 4-bit, or 2-bit gray-scale representations of each pixel as well as bi-tonal representations. Other formats can be added including other standard image formats and other custom formats.

Except for formats based on raw image data, all clipped images are based on normalized pixels. Within the area to be captured, the darkness of the contents to be saved may vary significantly from sheet to sheet. For example, if the area contains a handwritten material such as (a) a response to an open-ended assessment, (b) a comment to an open-ended survey question, or (c) a respondent's name and address, the darkness of handwriting can vary significantly from individual to individual and can vary significantly depending on the writing instrument used, the preferred implementation of this invention includes the calculation of special "image normalization" parameters for the area of interest. While the normalized pixels based on the sheet will be appropriate for many instances, they may be inappropriate for others. Using the same procedures as used to normalize the entire sheet, separate parameters can be used to determine the "whitest white" or the "darkest dark" for each pixel or over the image area. In the preferred embodiment, the white values from the sheet normalization are used on a pixel-by-pixel basis, and a single darkest dark value is calculated for the image. This process permits rapid adjustment of the normalization parameters for the image with a minimum of computation.

For 8-bit formats, the normalized pixels are used. For 4-bit formats, the high order nibble of the 8-bit normalized pixels are used. For the custom 2-bit images, a special lookup table converts the 8-bit normalized pixels to no mark, light, medium, and dark based on three cutoff values. For bi-tonal, 1-bit images, the single cutoff procedure is applied to the normalized pixels: values at or above the cutoff being set as white and values below the cutoff being set as black

What is claimed is:

1. A computer-implemented method of normalizing darkness values of pixels captured from a form by an optical scanning device, to enable subsequent processing of the contents of the form based on a relative darkness of the pixels, said method comprising the steps of:
   a) scanning the form with an optical scanning device capable of producing pixel darkness values related to a relative amount of light reflected from the form;
   b) recording on computer-readable media a darkness value of individual pixels from the scanned form;
   c) defining an area of the form to examine for determining pixel normalization parameters;
   d) identifying the pixel darkness value corresponding to a least amount of light reflected within the area;
   e) determining a normalization scale such that the pixel darkness value corresponding to the least amount of light reflected corresponds to a darkness value corresponding approximately to pure black; and
   f) applying the normalization scale to the recorded darkness values to create normalized darkness values.

2. A method as in claim 1, wherein the optical scanning device is capable of producing pixel darkness values corresponding to a standard scale of darkness increments between pure black and pure white, and the step of determining a normalization scale is accomplished by the sub-steps of:
   a) providing a plurality of look-up tables each having a differentiated scale of fewer increments than the standard scale, and
   b) selecting a look-up table based upon a difference between the pixel darkness value corresponding to the least amount of reflected light and the standard scale value corresponding to pure black.

3. A method as in claim 2 wherein the standard scale has increments from 0-255 from pure black to pure white.

4. A computer-implemented method of normalizing darkness values of pixels captured from a form by an optical scanning device, to enable subsequent processing of the contents of the form based on a relative darkness of the pixels, said method comprising the steps of:
   a) scanning the form with an optical scanning device capable of producing pixel darkness values related to a relative amount of light reflected from the form;

b) recording on computer-readable media a darkness value of individual pixels from the scanned form;
c) defining an area of the form to examine for determining pixel normalization parameters;
d) identifying the pixel darkness value corresponding to a greatest amount of light reflected within the area;
e) determining a normalization scale such that the pixel darkness value corresponding to the greatest amount of light reflected corresponds to a darkness value corresponding approximately to pure white; and
f) applying the normalization scale to the recorded darkness values to create normalized darkness values.

5. A method as in claim 4, wherein the optical scanning device is capable of producing pixel darkness values corresponding to a standard scale of darkness increments between pure black and pure white, and the step of determining a normalization scale is accomplished by the sub-steps of:
   a) providing a plurality of look-up tables each having a differentiated scale of fewer increments than the standard scale, and
   b) selecting a look-up table based upon a difference between the pixel darkness value corresponding to the greatest amount of reflected light and the standard scale value corresponding to pure white.

6. A method as in claim 5, wherein the standard scale has increments from 0-255 from pure black to pure white.

7. A computer-implemented method of normalizing darkness values of pixels captured from a form by an optical scanning device, to enable subsequent processing of the contents of the form based on a relative darkness of the pixels, said method comprising the steps of:
   a) scanning the form with an optical scanning device capable of producing pixel darkness values related to a relative amount of light reflected from the form;
   b) recording on computer-readable media the darkness value of individual pixels from the scanned form;
   c) defining an area of the form to examine for determining pixel normalization parameters;
   d) identifying the pixel darkness values corresponding to a greatest amount of light reflected and a least amount of light reflected within the area;
   e) determining a normalization scale such that the pixel darkness value corresponding to the greatest amount of light reflected corresponds to a darkness value corresponding approximately to pure white and the pixel darkness value corresponding to the least amount of light reflected corresponds to a darkness value corresponding approximately to pure black; and
   f) applying the normalization scale to the recorded darkness values to create normalized darkness values.

8. A computer-implemented method of normalizing darkness values of pixels captured from a form by an optical scanning device having multiple optical elements, to enable subsequent processing of the contents of the form based on a relative darkness of the pixels, said method comprising the steps of:
   a) scanning the form with an optical scanning device having multiple optical elements capable of producing pixel darkness values related to a relative amount of light reflected off the form to an element;
   b) recording on computer-readable media the pixel darkness values produced by each optical element;
   c) defining a section of the form to examine for determining pixel normalization parameters;
   d) identifying, for each optical element, the pixel darkness value corresponding to a least amount of light reflected within the section;
   e) determining a normalization scale for each optical element such that the pixel darkness value corresponding to the least amount of light reflected corresponds to a darkness value corresponding approximately to pure black; and
   f) applying the appropriate normalization scale to the recorded darkness values to create normalized darkness values.

9. A method as in claim 8, wherein each optical scanning element is capable of producing pixel darkness values corresponding to a standard scale of darkness increments between pure black and pure white, and the step of determining a normalization scale is accomplished by the sub-steps of:
   a) providing a plurality of look-up tables each having a differentiated scale of fewer increments than the standard scale, and
   b) selecting a look-up table based upon a difference between the pixel darkness value corresponding to the least amount of reflected light and the standard scale value corresponding to pure black.

10. A computer-implemented method of normalizing darkness values of pixels captured from a form by an optical scanning device having multiple optical elements, to enable subsequent processing of the contents of the form based on a relative darkness of the pixels, said method comprising the steps of:
    a) scanning the form with an optical scanning device having multiple optical elements capable of producing pixel darkness values related to a relative amount of light reflected off the form to an element;
    b) recording on computer-readable media the pixel darkness values produced by each optical element;
    c) defining a section of the form to examine for determining pixel normalization parameters;
    d) identifying, for each optical element, the pixel darkness value corresponding to a greatest amount of light reflected within the section;
    e) determining a normalization scale for each optical element such that the pixel darkness value corresponding to the greatest amount of light reflected corresponds to a darkness value corresponding approximately to pure white; and
    f) applying the appropriate normalization scale to the recorded darkness values to create normalized darkness values.

11. A method as in claim 10, wherein each optical scanning element is capable of producing pixel darkness values corresponding to a standard scale of darkness increments between pure black and pure white, and the step of determining a normalization scale is accomplished by the sub-steps of:
    a) providing a plurality of look-up tables each having a differentiated scale of fewer increments than the standard scale, and
    b) selecting a look-up table based upon a difference between the pixel darkness value corresponding to the greatest amount of reflected light and the standard scale value corresponding to pure white.

12. A computer-implemented method of normalizing darkness values of pixels captured from a form by an optical scanning device having multiple optical elements, to enable subsequent processing of the contents of the form based on a relative darkness of the pixels, said method comprising the steps of:
    a) scanning the form with an optical scanning device having multiple optical elements capable of producing pixel darkness values related to a relative amount of light reflected off the form to an element;

b) recording on computer-readable media the pixel darkness values produced by each optical element;
c) defining a section of the form to examine for determining pixel normalization parameters;
d) identifying, for each optical element, the pixel darkness value corresponding to a greatest amount of light reflected to any optical element within the section;
e) identifying the pixel darkness value corresponding to a least amount of light reflected to any optical element within the section;
f) determining a normalization scale for each optical element such that the pixel darkness value corresponding to the greatest amount of light reflected corresponds to a darkness value corresponding approximately to pure white and the pixel darkness value corresponding to the least amount of light corresponds to approximately pure black; and
g) applying the appropriate normalization scale to the recorded darkness values to create normalized darkness values.

13. A computer-implemented method of normalizing the darkness value of pixels captured by optically scanning a form, to enable subsequent processing of the contents of the form based on a relative darkness of the pixels, said method comprising the steps of:
a) scanning the form with an optical imaging scanner having an array of optical elements capable of producing an image of the form and, for each pixel of the image, a gray scale value of light reflected off the form, the scale ranging from 0 for pure black to 255 for pure white;
b) recording on computer-readable media the gray scale value for each pixel;
c) defining an area within the image of the form to examine for determining pixel normalization parameters;
d) detecting, for each optical element, a highest recorded gray scale value within the area;
e) determining a normalization scale for each optical element based upon a difference between its highest gray scale value and 255; and
f) applying the associated normalization scale to pixels within the captured image to covert gray scale values to normalized values.

14. A computer-implemented method of normalizing the darkness value of pixels captured by optically scanning a form, to enable subsequent processing of the contents of the form based on a relative darkness of the pixels, said method comprising the steps of:
a) scanning the form with an optical imaging scanner having an array of optical element capable of producing an image of the form and, for each pixel of the image, a gray scale value ranging from 0 for pure black to 255 for pure white;
b) recording on computer-readable media the gray scale value for each pixel;
c) defining an area within the image of the form to examine for determining pixel normalization parameters;
d) detecting, for each optical element, a highest recorded gray scale value within the area;
e) determining a white normalization scale for each optical element related to a difference between the highest gray scale value and 255;
f) applying the associated white normalization scale to pixels within the captured image;
g) detecting a lowest gray scale value recorded within the area;
h) determining a black normalization scale for each optical element related to a difference between the lowest gray scale value and 0; and
i) applying the black normalization scale to the white normalized values.

15. A computer-implemented method of normalizing a color intensity value of pixels captured from a form, to enable subsequent processing of the contents of the form based on a relative darkness of the pixels, said method comprising the steps of:
a) scanning the form with an optical imaging scanner capable of producing an image of the form and, for each pixel in the image, a color scale value related to a relative amount of light in a particular color band that is reflected from the form;
b) recording on computer-readable media the color scale value for each pixel in the image;
c) defining an area within the image of the form to examine for pixel normalization;
d) detecting a highest color scale value of pixels within the area;
e) determining a normalization parameter related to the difference between the highest color scale value of pixels within the area to the highest value of the scale; and
f) applying the normalization parameter to pixels within the captured image to covert a pixel's color scale value to a normalized value.

16. A computer-implemented method of normalizing a color scale value of pixels captured from a form, to enable subsequent processing of the contents of the form based on a relative darkness of the pixels, said method comprising the steps of:
a) scanning the form with an optical imaging scanner capable of producing an image of the form and, for each pixel in the image, a color scale value related to a relative amount of light in a particular color band that is reflected by the form;
b) recording on computer-readable media a color scale value for each pixel in the image;
c) defining an area within the image of the form to examine for determining pixel normalization parameters;
d) detecting a highest and a lowest color scale values of pixels within the area;
e) determining a normalization parameter related to a difference between the highest color scale value of pixels within the area to the highest value of the scale, and related to a difference between the lowest color scale value of pixels within the area to the lowest value of the scale; and
f) applying the normalization parameter to pixels within the captured image to covert a pixel's color scale value to a normalized value.

17. A computer-implemented method of converting a gray scale scanned image to a bi-tonal digital image, the method comprising the steps of:
a) scanning a form with an optical imaging scanner capable of producing an image of the form and, for each pixel in the image, a gray scale value related to a relative amount of light reflected by the form;
b) recording on computer-readable media a gray scale value for each pixel in the image;
c) defining an area within the image of the form to examine for pixel normalization;
d) detecting a highest gray scale value of pixels within the area;

e) determining a normalization parameter related to the difference between the highest gray scale value of pixels within the area to a value corresponding approximately to a pure white sheet;
f) applying the normalization parameter to pixels within the captured image of the form to covert a pixel's gray scale value to a normalized value;
g) selecting a cut-off value within the gray scale; and
h) converting all pixels with normalized gray values above the cut-off value to the bi-tonal digit 0 (white), and all pixels with normalized gray values below the cut-off value to the bi-tonal digit 1 (black).

18. A computer-implemented method of optical mark reading (OMR) with an optical imaging scanner, said method comprising the steps of:
   a) scanning a sheet printed with a plurality of OMR response targets with a scanner capable of producing an image of the sheet and any OMR response marks made thereon, and, for each pixel in the image, a scale value related to a relative amount of light reflected from the sheet;
   b) recording on computer-readable media the scale value of reflected light for each pixel;
   c) defining an area within the image to examine for pixel normalization;
   d) detecting a highest scale value of pixels within the area;
   e) determining a normalization parameter related to the difference between the highest scale value of pixels within the area to a value corresponding approximately to a pure white sheet;
   f) applying the normalization parameter to pixels within the captured image of the form to covert a pixel's scale value to a normalized value;
   g) selecting a cut-off value within the scale;
   h) converting all pixels with normalized values above the cut-off to the bi-tonal digit 0 (white) and all pixels with normalized values below the cut-off to the bi-tonal digit 1 (black); and
   i) interrogating pixels within a proscribed area around an expected location of an OMR response target for bi-tonal values of 1 as an indication of an OMR response mark.

* * * * *